March 8, 1955

G. O. ROCKWELL 2,703,873

DEPTH CHARGE ATTACK INDICATOR

Filed Nov. 1, 1944

INVENTOR.
Gaynor O. Rockwell

BY
ATTORNEY

March 8, 1955    G. O. ROCKWELL    2,703,873
DEPTH CHARGE ATTACK INDICATOR

Filed Nov. 1, 1944    5 Sheets-Sheet 3

INVENTOR.
Gaynor O. Rockwell
BY George Sipkin
Lee J. Huntzberger
ATTORNEY

INVENTOR.
Gaynor O. Rockwell
BY George Sipkin
Lee T. Huntzberger
ATTORNEY

March 8, 1955  G. O. ROCKWELL  2,703,873
DEPTH CHARGE ATTACK INDICATOR

Filed Nov. 1, 1944  5 Sheets-Sheet 5

INVENTOR.
Gaynor O. Rockwell
BY George Sipkin
Lee P. Huntzberger
ATTORNEY

United States Patent Office 2,703,873
Patented Mar. 8, 1955

2,703,873

DEPTH CHARGE ATTACK INDICATOR

Gaynor O. Rockwell, New London, Conn., assignor to the United States of America as represented by the Secretary of the Navy Application November 1, 1944, Serial No. 561,453

5 Claims. (Cl. 340—6)

The present invention relates to a means for determining the general direction of depth charge explosions. More particularly it relates to a means whereby the crew of a submerged submarine undergoing a depth charge attack can determine the solid octant, bounded by intersecting horizontal and vertical planes, in which the attack is centered, and, knowing this, can attempt suitable evasive action.

Heretofore submarines have had no means of determining whether a depth charge attack, inaccurately aimed, was centered ahead or astern, above or below, or to port or starboard since they were inside the hull, and on the arrival of the pressure wave front emanating from a depth charge explosion, could receive no indication of direction. The present invention provides an acoustic-electronic means for determining the sequence of arrival of the initial pressure wave at various locations on the ship and thus obtaining an indication of the octant from which the wave has come and in which the explosion has occurred. It employs a number of specially protected hydrophones, known as blastphones, and electronic discriminator circuits.

Referring now to the accompanying illustrations:

Figure 1:
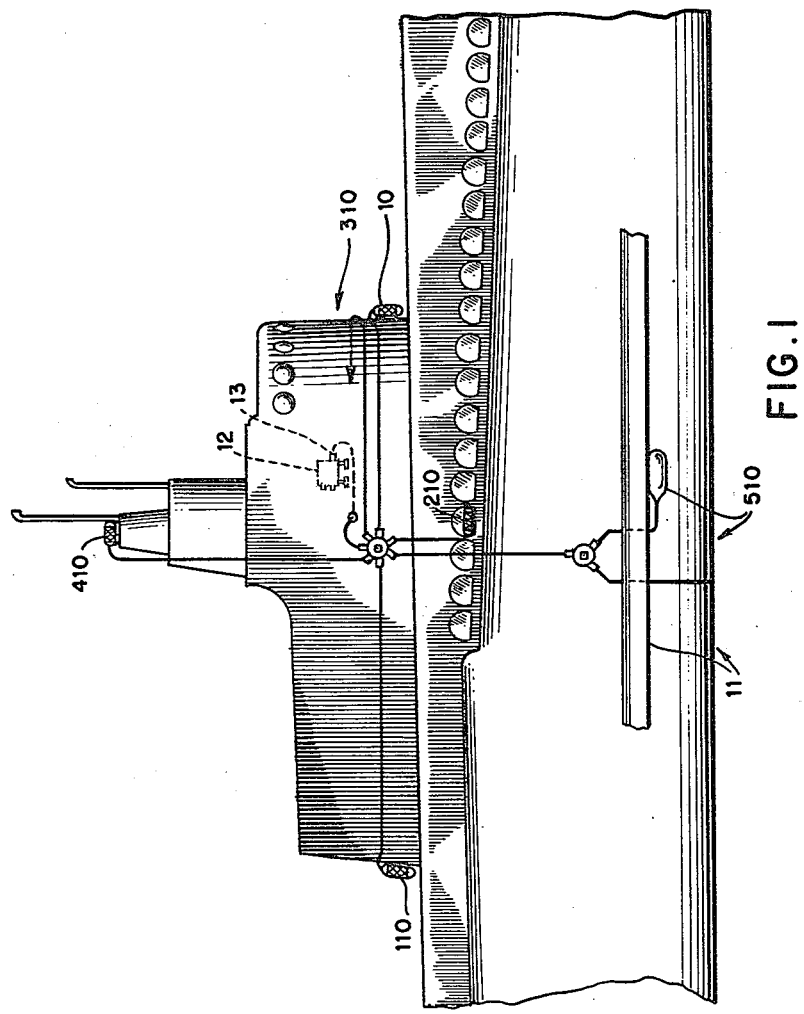
Fig. 1 is a side elevation of a portion of a submarine, showing the location of the blastphones.

Referring now to Fig. 1, blastphones are mounted on the exterior of the submarine in opposed pairs as follows: One, 10, on the forward end of the conning tower and one, 110, on the after end; one, 210, on the starboard side abreast of the conning tower in one of the superstructure drain holes and one, 310, on the port side; one, 410, on the periscope superstructure and two, 510, in streamlined housings under the bilge keels 11. There are two lower blastphones 510 since it is not feasible to place a single blastphone directly under the keel and a single unit in any other location would be "shaded" by the keel from wave fronts coming from the opposite side of the hull. The blastphones are connected to an equipment cabinet 12 inside the ship by suitable cables, their associated junction boxes and a multiconductor plug and jack 13.

Figure 2:
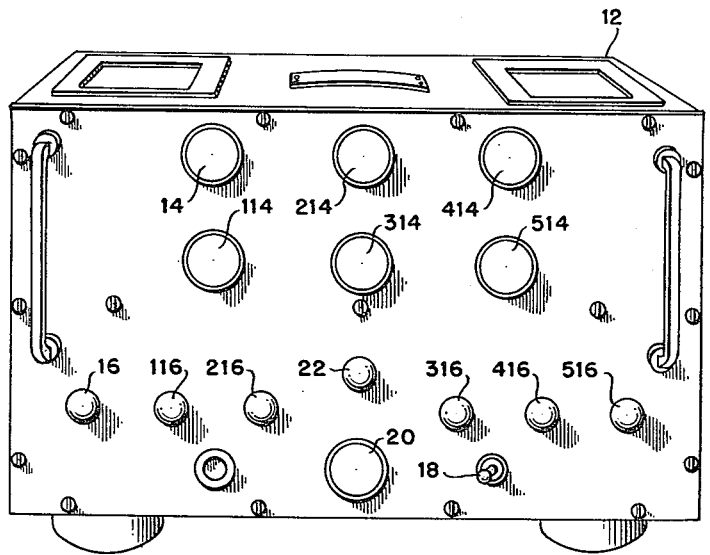
Fig. 2 is a view in elevation of the equipment cabinet and indicator panel.

Referring to Fig. 2, the controls for the indicator are housed in the cabinet 12, on the front panel of which are mounted six direction indicating lamps arranged in pairs and labeled to correspond to the sectors covered by the six blastphone positions: ahead 14 and astern 114, port 214 and starboard 314, and above 414 and below 514; six pushbutton switches, correspondingly numbered from 16 to 516, for recharging the blastphones; a power switch 18 and its associated indicating lamp 20; and a manual resetting switch 22. The direction from which the explosion wave front reaches the submarine is indicated by the illumination of three of the indicating lamps, one in each pair, controlled by the blastphones.

Figure 3:
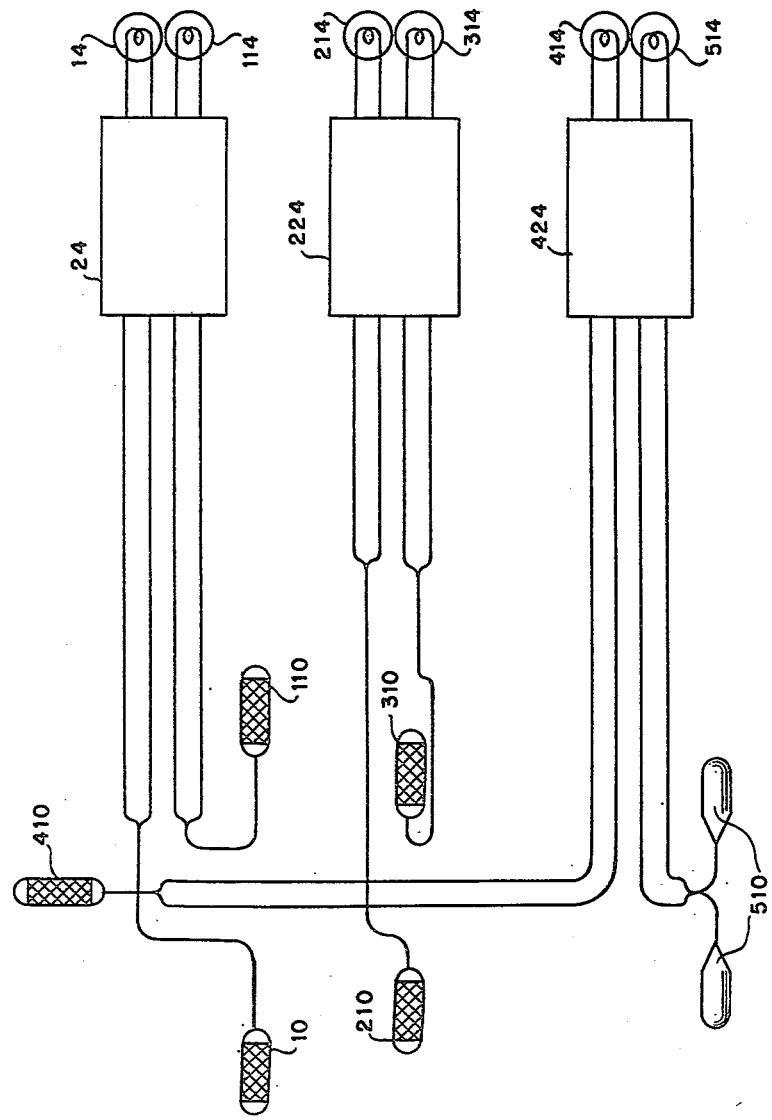
Fig. 3 is a block diagram of the circuit of the device.

Referring to Fig. 3, the entire control means is divided into three identical electronic units 24, 224 and 424, each associated with one pair of blastphones. Each of these units acts to determine whether explosion wave fronts striking its associated blastphones come from one or the other of the two general directions as represented by a pair of the direction indicating lamps. In general this discrimination is possible because the wave front reaches one blastphone of each pair before it does the other.

Figure 4:
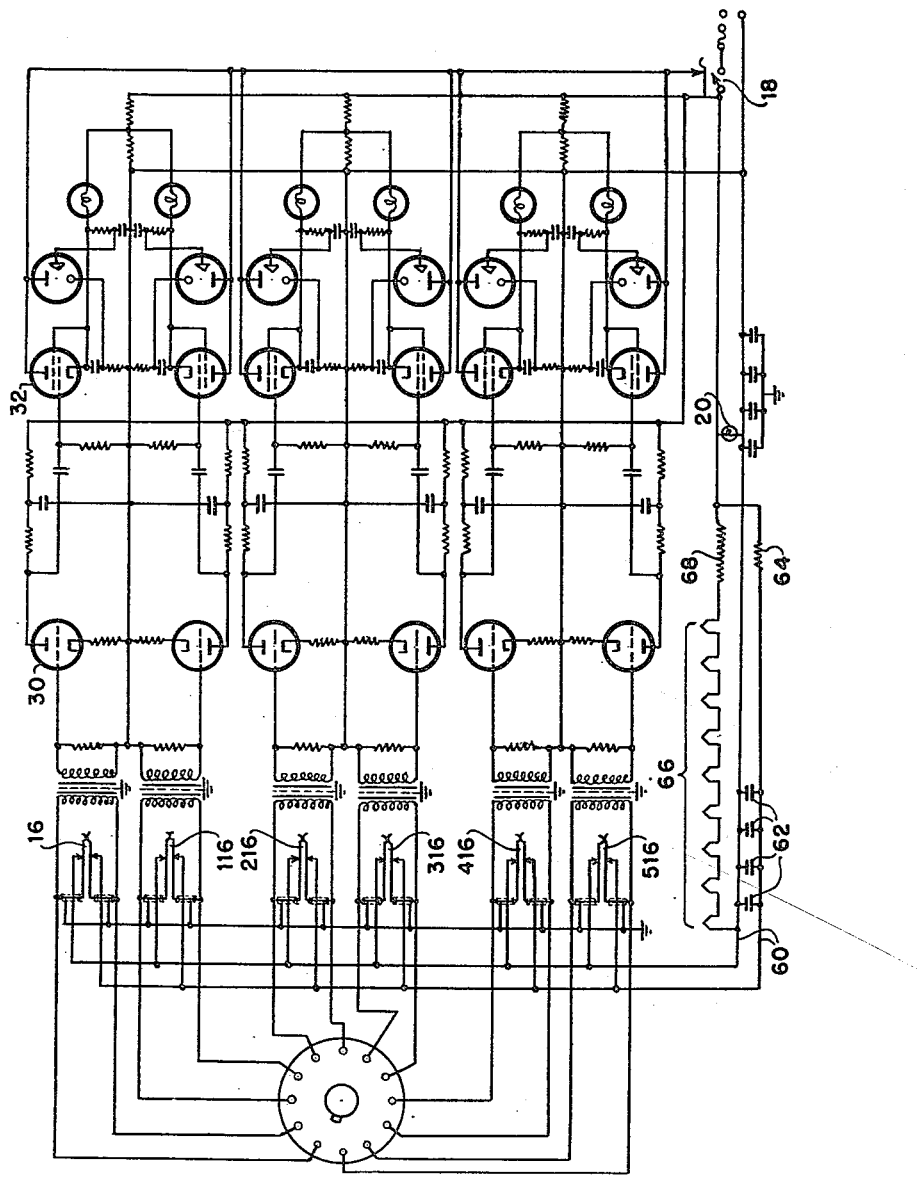
Fig. 4 is a circuit diagram of the entire device.
Figure 5:
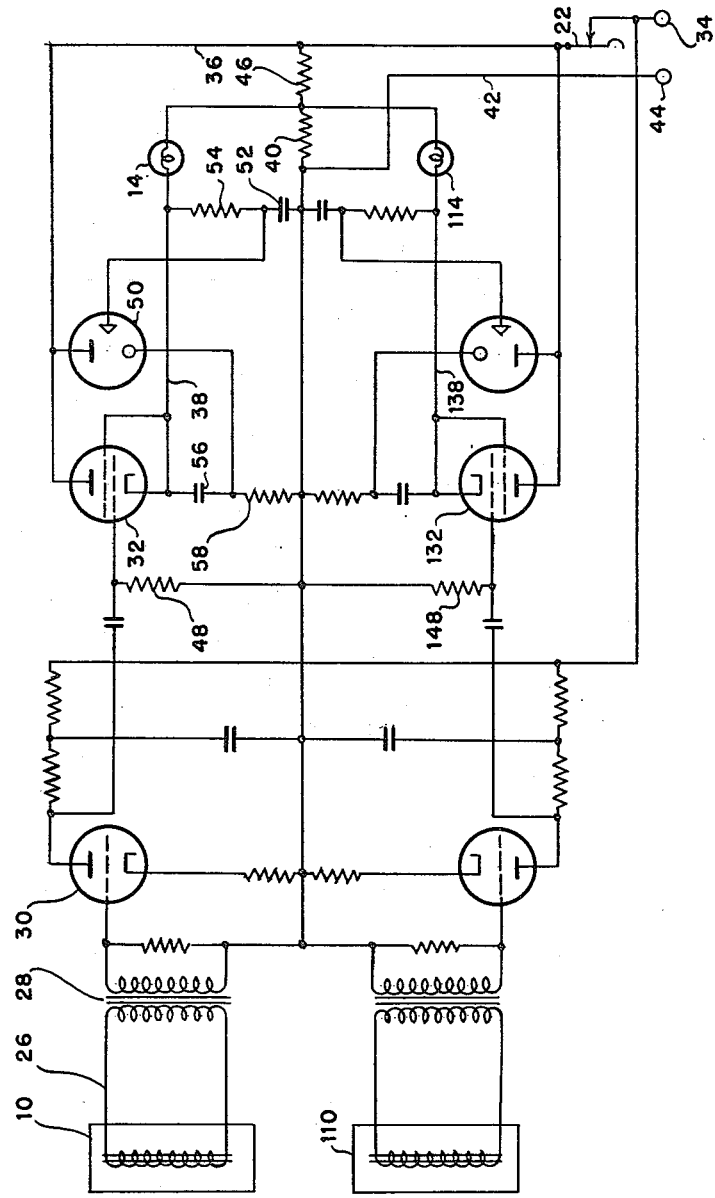
Fig. 5 is a circuit diagram of one portion of the device.

Referring generally to Fig. 4, and more particularly to Fig. 5, for a detailed consideration of the operation of the device, the section of the control circuit shown is that associated with a pair of blastphones, in this instance those determining whether an explosion occurs ahead or astern of the submarine.

Assume that the explosion takes place ahead of the submarine. The wave front reaches the forward blastphone 10 before it reaches the after blastphone 110. The variation in pressure impinging on the forward blastphone 10 distorts it, causing it to generate a varying voltage which electrically represents the pressure variation due to the explosion. This electrical signal is conducted to the equipment by the cables represented by 26, passes through an input transformer 28 and is amplified by a vacuum tube 30. The amplified signal passes to the grid of a thyratron 32 which is made conductive by its action. When the thyratron 32 becomes conductive, a circuit is completed through the tube from the positive battery terminal 34 by way of the resetting switch 22, the wires 36 and 38, the "ahead" indicating lamp 14, a resistor 40 and the lead 42 to the negative terminal 44. This lights the "ahead" indicating lamp 14. The resistor 40 and a resistor 46, together, act as a voltage divider across the battery circuit to maintain the cathodes of the thyratrons 32 and 132 at a certain positive potential with respect to the negative side of the circuit 42. Since the grids of the thyratrons are connected to the negative lead this positive potential of the cathodes establishes the proper negative grid bias for the tubes. Resistors 48 and 148 serve to limit the grid currents in the thyratrons 32 and 132 respectively.

At the time the thyratron 32 becomes conductive, the potential difference between its anode and grid drops from a value which is equal to the difference between the voltage between terminals 34 and 44 and the grid bias voltage to about ten volts. This raises its cathode potential with respect to the negative side of the circuit to a far higher level and increases the voltage drop across the resistor 40. This increases the negative grid bias on the thyratron 132 in the other half of the circuit because of the connection of its cathode to the cathode circuit of the thyratron 32 by way of the wire 138 and the "astern" indicating lamp 114.

Since the grid of a thyratron can only initiate current flow between anode and cathode, an auxiliary circuit is provided for each thyratron to interrupt the current flow, extinguishing the indicator lamp and preparing the circuit for the next operating cycle. This "resetting" circuit includes a cold-cathode triode gas tube 50, a condenser-resistor timing circuit made up of condenser 52 and resistor 54, and a condenser 56 connected between the cathode of the thyratron and the cold-cathode tube. Resistor 58 is interposed between the cold cathode and the negative lead 42 to limit the discharge of the cold-cathode tube.

The resetting circuit operates as follows: Up to the instant at which the thyratron 32 is made conductive, the condensers 52 and 56 are charged at a voltage equal only to the grid bias voltage. When the thyratron is made conductive, the condenser 56 charges very rapidly until the voltage across it is equal to the cathode-to-negative voltage of the thyratron. Meanwhile the condenser 52 charges slowly by reason of the high resistance of the resistor 54 until the voltage across it is equal to the breakdown voltage between the starting electrode and the cathode of the cold-cathode tube 50. At this instant the cold-cathode tube discharge starts. The result of this discharge is to provide a low resistance path through the cold-cathode tube 50 to connect the condenser 56, charged practically to line voltage, across the thyratron 32 with opposed polarity. Discharge of the condenser 56 momentarily reverses the voltage applied to the thyratron 32, deionizing it, thus stopping the current flow between anode and cathode, and making it receptive to the next incoming signal.

In the event that the voltage, supplied by the submarine's storage batteries, drops low enough to prevent operation of the cold-cathode tube 50, the manually operated switch 22 may be operated to break the plate supply line, interrupting the current and resetting the circuit.

Referring now to Fig. 4 alone, the blastphone recharging switches 16, 116, etc., are provided to permit remagnetization of the blastphones whenever necessary, possibly after each depth charge attack, to maintain their sensitivity. The two moving contacts of each switch are connected to the leads between its associated blastphone and transformer. The two fixed contacts of each are connected to common leads 60 from a bank of condensers 62. This condenser bank is charged from the battery through a current-limiting resistor 64. To resensitize a blastphone it is only necessary to press its associated recharging switch button. This discharges the condenser bank through the blastphone circuit and the surge of current remagnetizes the blastphone. After a slight delay to permit recharging of the condenser bank the operation can be repeated for another blastphone.

The cathode heaters 66 of the amplifier tubes 30, 130, etc., and of the thyratrons 32, 132, etc., are connected in series and supplied from the battery through a resistor 68 of suitable size.

What is claimed is:

1. In a submersible apparatus for determining the arrival of a wave front emanating from an explosion comprising, a plurality of pairs of spaced blastphones each responsive to the arrival of an explosive wave front to produce a signal, individual blastphones of each pair being positioned on opposite sides of said apparatus, a plurality of circuits connecting in pairs the oppositely positioned blastphones of a pair, an individual indicator for each of said blastphones, first circuit means connecting each of said indicators with its respective blastphone whereby energization of a first blastphone in any one of said pairs produces said signal for actuating the corresponding indicator, second circuit means connecting the indicator associated with one of each of said pairs of blastphones with the indicator of the other blastphone of said pair, said second circuit means containing means whereby actuation of one of said indicators prevents actuation of the other, and a resetting circuit connected with each of said indicators for extinguishing the actuated indicator and preparing said first circuit means for the next explosion.

2. In a submersible apparatus for determining the arrival of a wave front emanating from an explosion comprising a plurality of pairs of spaced blastphones each responsive to the arrival of an explosive wave front to produce a signal, individual blastphones of each pair being positioned on opposite sides of said apparatus, a plurality of circuits connecting in pairs the oppositely positioned blastphones of a pair, an individual indicator for each of said blastphones, first circuit means connecting each of said indicators with its respective blastphone whereby energization of a first blastphone in any one of said pairs produces said signal for actuating the corresponding indicator, second circuit means connecting the indicator associated with one of each of said pairs of blastphones with the indicator of the other blastphone of said pair, said second circuit means containing means whereby actuation of one of said indicators prevents actuation of the other, and a resetting circuit connected with each of said indicators for extinguishing the actuated indicator and preparing said first circuit means for the next explosion, and an auxiliary circuit including a normally charged condenser system connectible at will to magnetizing coils on said blastphones for maintaining the sensitivity of said blastphones.

3. The apparatus of claim 2 in which one pair of blastphones is spaced longitudinally of the apparatus, a second pair is spaced transversely of the apparatus and other blastphones are disposed at differing heights thereon, whereby said indicators associated therewith indicate the solid octant in which the explosion occurs.

4. The apparatus of claim 1 in which one pair of blastphones is spaced longitudinally of the apparatus, a second pair is spaced transversely and a third pair vertically thereof, whereby said indicators provide an indication of the solid octant in which an explosion occurs.

5. The apparatus of claim 1 in which three oriented pairs of spaced blastphones are disposed parallel, respectively, to mutually perpendicular axes and the associated indicators are operative to indicate the octant in rectangular coordinates in which the explosion occurs.

References Cited in the file of this patent

UNITED STATES PATENTS

| | | |
|---|---|---|
| 1,691,395 | Langmuir | Nov. 13, 1928 |
| 2,007,211 | Nicolson | July 9, 1935 |
| 2,221,569 | Berkey et al. | Nov. 12, 1940 |
| 2,369,081 | Shook et al. | Feb. 6, 1945 |
| 2,378,939 | Nicolson | June 26, 1945 |
| 2,398,411 | Cook | Apr. 16, 1946 |